UNITED STATES PATENT OFFICE.

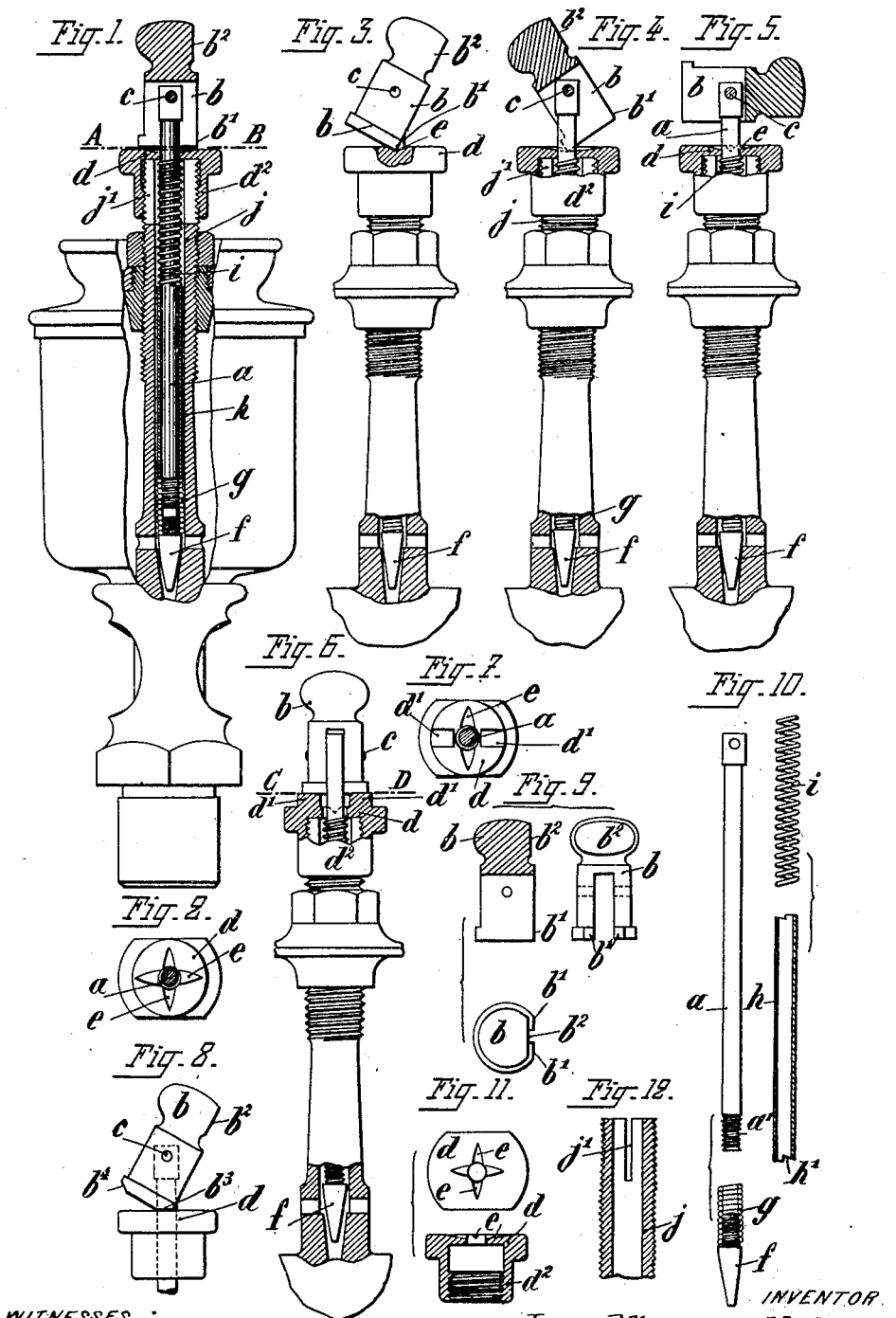

JEAN NÉPOMUCÈNE HOCHGESAND, OF PARIS, FRANCE.

LUBRICATOR WITH SUPPLEMENTARY DELIVERIES.

No. 892,256.  Specification of Letters Patent.  Patented June 30, 1908.

Application filed July 30, 1902. Serial No. 117,654.

*To all whom it may concern:*

Be it known that I, JEAN NÉPOMUCÈNE HOCHGESAND, of 200 Quai Jemmapes, in the city of Paris, Republic of France, engineer, have invented a Lubricator with Supplementary Deliveries, of which the following is a full, clear, and exact description.

The present invention relates to an arrangement for regulating delivery, applicable more particularly to lubricators, and enabling the position of the rod regulating the flow to be known at a distance or at night by the touch.

My arrangement of apparatus is characterized particularly by the fact that the rod regulating the flow carries a rocking button capable of occupying an inclined position, thus permitting an extra flow in excess of the normal flow without altering the regulation previously established, and constituting besides an indicating means; in ordinary lubricators with means for regulating the flow, it is not possible to know at a distance whether the rod regulating the flow is in the position of normal delivery or in a position giving an increased delivery, for when the lubricator is in use the operating button is always upright and it is impossible to ascertain whether it is more or less raised. On the contrary with the apparatus herein described, if the button is vertical it is certain that the lubricator is working with its normal delivery, and if it is inclined, one is aware that the lubricator is giving an extra flow. In order that the button may be retained in an inclined position, the seat upon which it rests has a groove passing across the axis of the rod regulating the flow, and in which the edge of the lower part of the button engages.

My invention further relates to the method of mounting the needle valve; this latter is mounted upon a spiral spring attached to the end of the regulating rod. By means of this elastic mounting, the needle valve is always applied exactly to its seat; further, this arrangement assures a perfect control of the needle valve by the regulating rod and enables all the parts constituting this regulating rod to be mounted and dismounted very easily.

In order that the invention may be more clearly understood, I have shown in the accompanying drawings my new regulating arrangement, by way of example only:

Figure 1 shows in section the application of my regulating arrangement to a lubricator of any system whatever, the operating button being in the vertical position corresponding to normal delivery. Fig. 2 is a horizontal section on the line A—B of Fig. 1. Figs. 3, 4 and 5, show different positions of the operating button, corresponding respectively to the two supplemental deliveries and to the closure of the valve. Fig. 6 shows a modification enabling in addition a very much increased delivery to be obtained. Fig. 7 is a horizontal section on the line C—D of Fig. 6. Fig. 8 shows another modification of my invention. Fig. 9 are detail views showing an elevation, a vertical section, and a plan, of the operating button. Fig. 10 shows the various parts of the regulating rod separately. Fig. 11 shows a vertical section and an upper side view of the regulating nut acting as a seat for the operating button. Fig. 12 is a vertical section of the upper part of the cylindrical body which incloses the regulating rod, taken on a plane at right angles to that of Fig. 1.

In these figures the same letters of reference indicate like parts.

As shown in the drawings, the rod $a$ regulating the flow, carries at its upper part a button $b$ which is movable on an axis $c$ so that it may assume a horizontal position when the apparatus is shut off, a vertical position when the apparatus is giving a normal delivery, and an inclined position when the apparatus is furnishing a greater delivery than usual. The seat $d$ upon which the operating button rests has one or more notches $e$ passing across the axis of the regulating rod $a$, as shown in Figs. 2 and 11, destined to receive the edge of the base of the button $b$ when this latter is inclined and to maintain it in this position.

The button $b$ may be inclined in two directions so as to give two supplementary deliveries of different quantities; the base of this button has a flat $b'$ cut on one of its sides, as shown in Fig. 9; thus if the button $b$ is inclined as shown in Fig. 3, so that the lower edge of the flat $b'$ engages in the notch $e$, a supplemental raising of the needle valve is obtained which is less than when the button $b$ is inclined in the opposite direction and the edge of the base of the button $b$ is engaged in the notch $e$ as shown in Fig. 4.

In order that the two sides of the button corresponding to the two supplemental deliveries may be easily distinguished, the head of the button $b$ has a flat $b^2$ cut on the same side as the flat $b'$, see Fig. 9.

The base of the button $b$ may have on each side a bevel $b^3$ $b^4$, as shown in Fig. 8, which rests upon the seat $d$ when the button is inclined and which will retain it in this position; in this case it will not be necessary to form the seat $d$ with notches or grooves $e$.

According to my invention the button $b$ therefore occupies different positions, very easy to be distinguished from a distance or by the touch, according to whether the apparatus is in the shut-off position, the normal position, or the lesser or greater of the supplemental delivery positions. If the button $b$ is placed horizontally (Fig. 5) the needle $f$ is pressed to its seat and the apparatus is shut off. If the button $b$ is placed vertically (Fig. 1) one can readily see that the apparatus is furnishing the normal delivery. On the contrary, if the button $b$ is inclined to one side or the other, one is notified that the apparatus is allowing a greater delivery than the normal, as above described. The seat $d$ may have a raised portion $d'$ as shown in Figs. 6 and 7, enabling the button $b$ to be maintained in a raised position, so as to obtain a much greater delivery.

The needle valve $f$ is mounted upon the regulating rod $a$ by means of a spring $g$ so as to possess an elasticity sufficient to enable it to seat itself accurately; this needle valve $f$ is fixed on one of the ends of the spring $g$ as shown in Fig. 10, and this latter is secured on to the threaded end $a'$ of the rod $a$.

The regulating rod $a$ has a sleeve $h$ which rests at one end against the spring $g$ and the other end of which is acted upon by the closing spring $i$ of the regulating rod, which spring bears at its other end against the interior face of the seat $d$.

The sleeve $h$ has a notch $h'$ as shown in Fig. 10, which acts to grip, when a rotative motion is imparted to this sleeve, the end of the spring $g$ and permits the latter to be unscrewed from the rod $a$ without difficulty.

The spring $g$ has for its object to connect the needle $f$ to the rod $a$; to retain together the different parts constituting the regulating rod without the necessity of a pin or nut; to prevent by its own character any accidental unscrewing; to obtain a regulating rod with a flexible end so as to cause the needle valve to seat itself perfectly and consequently to obtain complete closure when the apparatus is shut off.

The regulation of the normal delivery may be controlled by any of the ordinary and convenient methods; for example, by screwing or unscrewing the nut $d^2$, the upper part $d$ of which forms the seat for the operating button, upon the screw-threaded cylindrical body $j$ which incloses the regulating rod. In order to obtain perfect control of this nut $d^2$ and to avoid the use of the lock-nut, the cylindrical body $j$ is split at $j'$, as shown in Fig. 12, so as to form two parts slightly sprung apart and which by their elasticity prevent any accidental unscrewing of the nut $d^2$. The head of this latter is provided with two flat surfaces which enable it to be easily operated by hand or by means of a key.

My invention is applicable to all kinds of lubricators and the forms and details may be varied according to the different uses to which it may be applied.

Claims.

1. In a lubricator with supplementary deliveries, the combination of a needle valve, a rod at the lower end of which the needle valve is mounted, a button mounted at the end of said rod and adapted to rock, said button being provided with a flat portion, an adjustable cap nut adapted to serve as a seat for said button, and means consisting of notches adapted to retain the button in an inclined position either on one side or the other of the flat portion, so as to graduate the discharge of lubricating oil.

2. In a lubricator with supplementary deliveries, the combination of a rod provided with a needle valve, a button mounted at the end of said rod and adapted to rock, said button being provided with a flat portion, and an adjustable cap nut adapted to serve as a seat for said button, said cap nut being provided with notches adapted to receive either the lower edge of the flat portion of said button, or the edge of the base opposite said lower edge of the flat portion, thereby retaining said button in one or the other of two inclined positions, so as to partially restrict the flow of oil.

The foregoing specification of my improvements in means for regulating delivery in lubricators and other apparatus signed by me this 18th day of July 1902.

JEAN NÉPOMUCÈNE HOCHGESAND.

Witnesses:
EDWARD P. MACLEAN,
MAURICE H. PIGNET.